(12) United States Patent
Cornelius

(10) Patent No.: US 6,457,763 B2
(45) Date of Patent: Oct. 1, 2002

(54) DEER HANDLE

(76) Inventor: Glenn E. Cornelius, 7400 English Ivy West, Olive Beach, MS (US) 38654

( * ) Notice: Subject to any disclaimer, the term of this patent is extended or adjusted under 35 U.S.C. 154(b) by 0 days.

(21) Appl. No.: 09/754,197

(22) Filed: Jan. 5, 2001

Related U.S. Application Data

(60) Provisional application No. 60/190,574, filed on Mar. 20, 2000.

(51) Int. Cl.$^7$ .................................................. B65G 7/12
(52) U.S. Cl. ....................................... 294/153; 294/165
(58) Field of Search .............................. 294/15, 26, 74, 294/137, 142, 150–157, 164, 165, 167

(56) References Cited

U.S. PATENT DOCUMENTS

| | | | | |
|---|---|---|---|---|
| 2,778,555 A | * | 1/1957 | Poryle | 294/153 |
| 2,812,206 A | * | 11/1957 | Brunn | 294/26 |
| 2,931,629 A | | 4/1960 | Keller | 254/409 |
| 3,188,130 A | * | 6/1965 | Pietrowicz | 294/74 |
| 3,752,525 A | | 8/1973 | Hanna et al. | 294/153 |
| 4,243,164 A | | 1/1981 | Burlison et al. | 294/146 |
| 4,431,121 A | | 2/1984 | Bensette | 294/153 |
| 4,488,748 A | * | 12/1984 | Burkes | 294/147 |
| 4,645,224 A | * | 2/1987 | Poganski | 294/15 |
| 4,696,504 A | * | 9/1987 | Roberts, Jr. | 294/165 |
| 4,730,863 A | * | 3/1988 | Guadnola | 294/167 |
| 4,828,307 A | * | 5/1989 | Sokol et al. | 294/153 |
| 5,131,707 A | | 7/1992 | Zazzara et al. | 294/156 |
| 5,183,334 A | * | 2/1993 | Geistlinger | 294/153 |
| 5,255,947 A | * | 10/1993 | Schwartz | 294/165 |
| 5,316,356 A | | 5/1994 | Nutting | 294/118 |
| 5,382,064 A | | 1/1995 | Blais | 294/26 |
| 5,447,088 A | * | 9/1995 | Mester | 84/422.4 |
| 5,516,175 A | * | 5/1996 | Christensen | 294/137 |
| 5,695,230 A | * | 12/1997 | Thompson | 294/15 |
| 5,848,816 A | * | 12/1998 | Hancock | 294/15 |
| 5,901,999 A | | 5/1999 | Brock | 294/153 |
| 5,971,458 A | * | 10/1999 | Contreas et al. | 294/150 |
| 6,089,636 A | * | 7/2000 | Harris | 294/150 |

FOREIGN PATENT DOCUMENTS

| | | |
|---|---|---|
| AU | 145434 | 2/1952 |
| CA | 1310235 | 11/1992 |

* cited by examiner

Primary Examiner—Eileen D. Lillis
Assistant Examiner—Paul T. Chin
(74) Attorney, Agent, or Firm—Richard C. Litman

(57) ABSTRACT

A game pull device having a handle which is of cylindrical construction. The first and second retainer channels are laterally disposed within the handle construction, and include an attachment element conveyed and fixed respectively thereto. The attachment element is made of nylon rope material having a predetermined tensile strength, and configured to terminate as a closed loop fastener or terminus, so as to form a single integrated game pull device. The handle of the deer pull also includes a gripping layer surrounding the cylindrically shaped element with the inclusion of an adhesive layer therebetween.

6 Claims, 4 Drawing Sheets

DEER HANDLE

CROSS-REFERENCE TO RELATED APPLICATION

This application claims the benefit of U.S. Provisional Patent Application Ser. No. 60/190,574, filed Mar. 20, 2000.

BACKGROUND OF THE INVENTION

1. Field of the Invention

The present invention relates generally to dragging devices. More specifically, the invention is a game dragging device for transporting animals from brush or wooded areas for delivery to transporting vehicles and/or captured game preparation stations.

2. Description of Related Art

A variety of different deer dragging devices have been devised having a distinct number of structural features. In most instances, as shown hereinbelow, conventional deer pulls include various mechanical mechanisms or fasteners for securing an attached game animal thereto. Manipulating these conventional devices, however, is not only cumbersome, but often debilitating for the hunter or user. These conventional devices often need constant mechanical adjustments during transport of captured game. A deer pull which requires virtually no mechanical adjustments, and is simple in construction, yet durable for transporting big game as herein described is lacking.

For example, U.S. Pat. No. 2,931,629 issued to R. J. Keller discloses a deer pull and pulley device having a pulley housing in which the pulley rotates. An eight foot rope material is trained about the pulley via a sleeve, and at opposite ends there are loop-forming bars made of aluminum material. A first and second loop arrangement is formed with a respective bar for mounting the shoulders of a hunter or user. Another portion of the rope extends through the pulley for attachment to a retaining bar which forms a combination loop and retainer around a portion of a deer.

U.S. Pat. No. 3,188,130 issued to Pietrowicz discloses a small game hanging device comprising an elongated plastic tubular body member having a first or medial looped thong which extends upwardly therefrom for suspending the device from an overhead support. The tubular body member includes first and second cap ends having central apertures through which looped thongs are conveyed as a single length of material. Washers are slidably mounted on the respective looped thongs which extend through the end caps for securing a leg or other body portion of the small game for hanging or suspension.

U.S. Pat. No. 3,752,525 issued to Hanna et al. discloses a deer dragging and tagging device comprising an elongated inner sleeve for storing a pencil, paper clip, deer tag and a pin for holding the tag to the ear of a deer. The device includes frictionally carried cap members covering the ends of a pair of hard plastic outer sleeves. Each sleeve has a flared end for retaining a line or cord made of nylon in a stored configuration. The cord extends through openings in the sleeves and is secured via a knot. A rectangular chocker member is provided with a pair of spaced apart openings through which the cord is passed. The sleeves are coupled together, and are separable via lateral movement in opposing directions, respectively.

U.S. Pat. No. 4,243,164 issued to Burlison et al. discloses a game dragging device comprising a tubular member with a pair of spaced clamp loops which are adjustable for releasable securement on front leg portions of a dead game animal. A line is secured to a central portion of the tubular member via a circular shaped connector for looping under and supporting the head portion of an animal in combination therewith. The hand of a user is made to be in close contact with the carcass of the animal.

U.S. Pat. No. 4,431,121 issued to Bensette discloses a game towing device comprising a frame having a pair of supports mounted on the back of a hunter via shoulder straps, and a pivotal carriage on which a forward portion of a deer is strapped and supported for transport. The carriage comprises a tubular, generally U-shaped member which has a slot for receiving a strap. The strap is adapted to be wrapped beneath and around the forelegs of a deer. Other mechanical fastener elements such as dowels are used for added security of the carriage.

U.S. Pat. No. 5,316,356 issued to Nutting discloses a game dragging device for attaching to the nostrils of a fallen game animal. The device comprises a pair of tongs which engages the bone or cartilage of the nostrils of a deer. The tongs are generally S-shaped and are pivotally joined together with line attachments at first and second ends. Each line attachment includes tubular handle portions including first and second rope fasteners. U.S. Pat. No. 5,382,064 discloses a similar game device which operates on a similar principle of piercing the carcass of an animal for subsequent dragging. A hook is used in combination with a asymmetrical ring element for pulling.

U.S. Pat. No. 5,901,999 issued to Brock discloses a device for carrying animals comprising a triangular-shaped handle with an eye or aperture for receiving or retaining a rope having first and second looped ends. The load of an animal is concentrated at the eye which has a tendency to fail due to material fatigue produced therein from cyclical stresses.

Other Patents issued to Cornford (AU 145,434), Hallett et al. (CA 1310235), and Zazzara U.S. Pat. No. (5,131,707) are of general relevance to the deer handle as herein described. In particular, the patent of Zazzara discloses a hanger carrier for transporting clothing instead of game.

None of the above inventions and patents, taken either singly or in combination, is seen to describe the instant invention as claimed.

SUMMARY OF THE INVENTION

The game or deer pull device according to the invention has a handle having first and second retainer channels for an attachment element which retains captured game. The first and second retainers are laterally disposed within the handle made of generally cylindrical construction, and include the attachment element conveyed and fixed respectively thereto. The attachment element is made of nylon rope material having a predetermined tensile strength, and configured to terminate as a closed loop fastener or terminus, so as to form a single integrated game pull device. The handle of the deer pull also includes a gripping layer which surrounds and fastens to the cylindrically shaped element via an adhesive layer disposed therebetween.

Accordingly, it is a principal object of the invention to provide a deer handle device for transporting big game or deer from forests or the brush.

It is another object of the invention to provide a deer handle device which is simple to use and impervious weather related and mechanical wear and tear.

It is a further object of the invention to provide a deer handle device with virtually no mechanical bolt or screw fasteners.

Still another object of the invention is to provide a deer handle device which is light-weight and easy to deploy and use.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed to a game pull device which assists hunters or users U in transporting captured game or deer G from wooded surroundings. The preferred embodiments of the present invention are depicted in FIGS. 1–4, and are generally referenced by numerals 4, 5 and 6, respectively.

Figure 1:
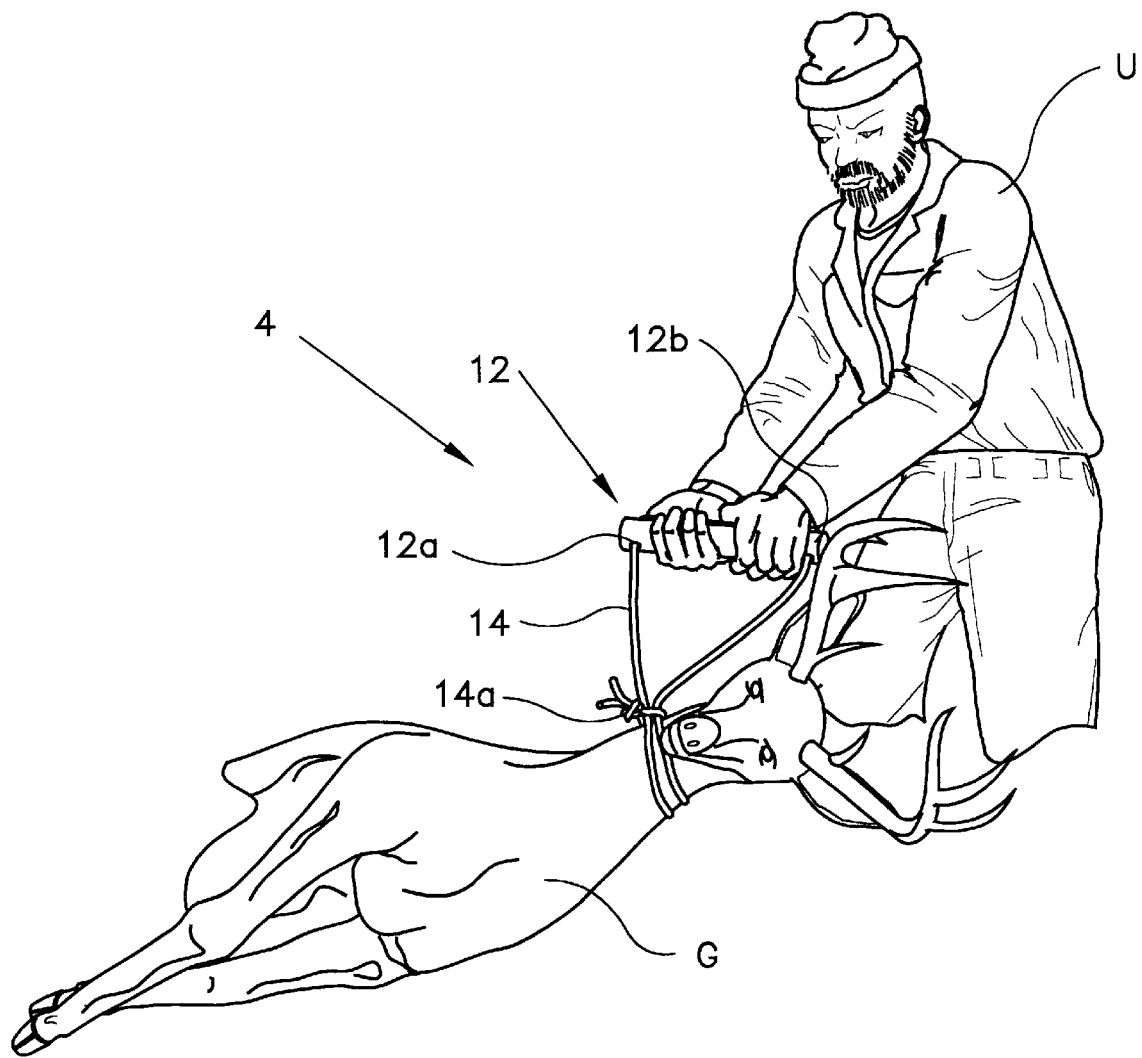
FIG. 1 is an environmental, perspective view of a deer handle according to the present invention.
Figure 2:
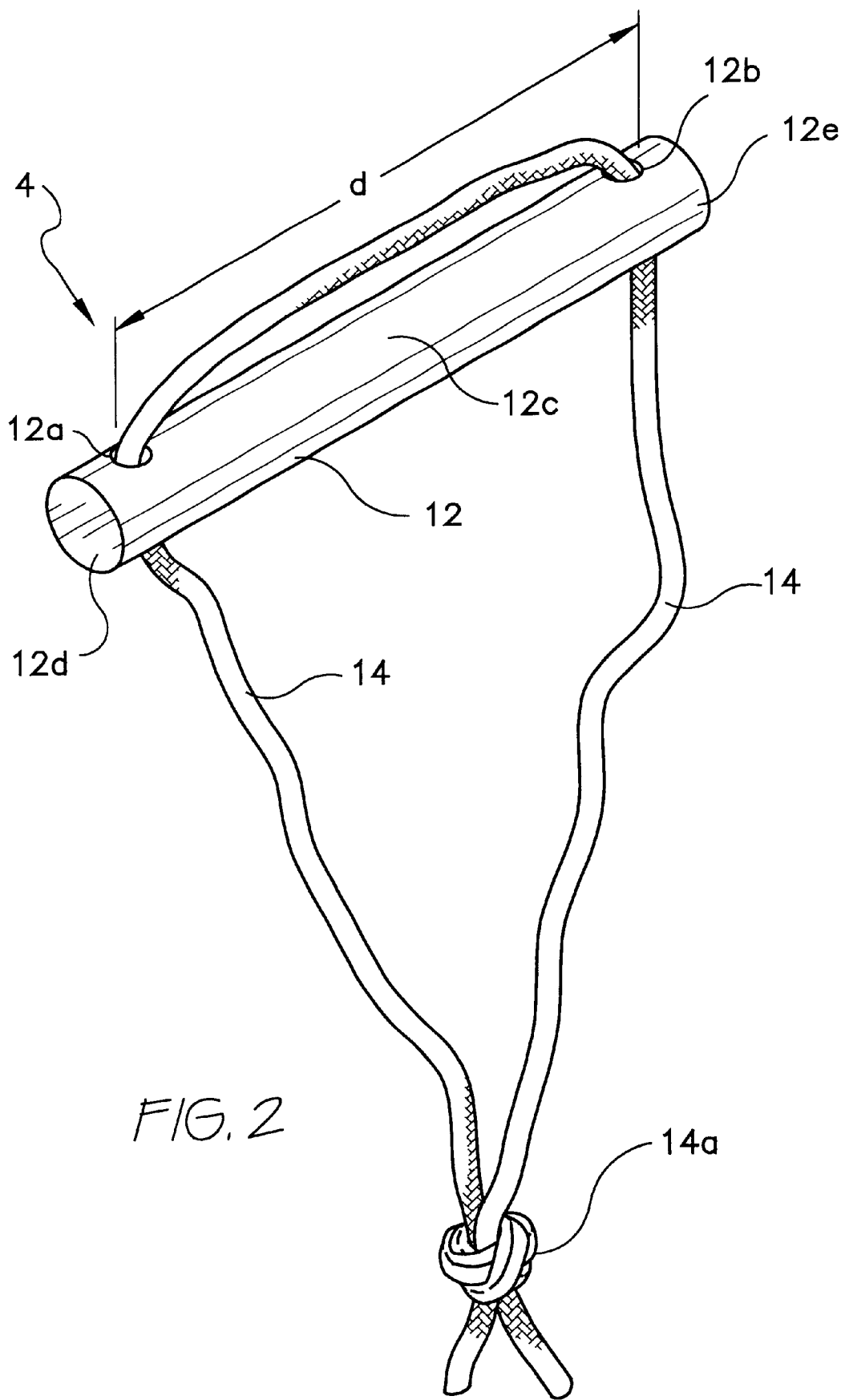
FIG. 2 is a perspective view of the deer handle according to a first embodiment.

As shown in FIGS. 1 and 2, the game pull device 4 comprises a handle 12 having first and second retainer channels 12a and 12b, respectively, and an attachment element or rope material 14. The first and second retainer channels 12a, 12b are laterally disposed within the handle 12, through which the rope 14 of predetermined length is conveyed or passed and fixed respectively thereto. The length and durability of the rope 14 can vary depending on the nature and size of the captured game. Notwithstanding, the rope 14 can be made to be adjustable in length by the formation of a series of a series of knots for a short length and the removal of such knots to increase the length of the rope 14, respectively. Accordingly, the rope 14 forms a closed loop via knot 14a which provides a means by which the rope 14 is securely attached to the handle 12 via respective first and second retainers 12a, 12b to form a single integrated game pull device 4.

The handle 12 is preferably six to seven inches in length for nominal ease of maneuverability or manipulation by a user U during actual game transport. In addition, the rope 14 is preferably 26 inch extension rope 14 having a predetermined tensile strength comparable to the weight requirements of big game, such that the strength of the rope 14 would be sufficient for effectively transporting deer G from the brush without the effects of cyclical stresses which produces material fatigue within the element fiber levels of the rope. Accordingly, the preferred rope material 14 is nylon or similar rope material.

As diagrammatically illustrated in FIGS. 1 and 2, the game pull device 4 has a handle 12 of solid cylindrical construction. The cylindrical handle element 12 is shown having a body portion 12c and first and second ends 12d and 12e, respectively. In proximal relation, the first 12a and second 12b retainer channels 12a, 12b have similar areas and are formed within the handle 12 in parallel relation, respectively. The channels 12a, 12b are disposed within the body portion 12c separated by a predetermined fixed distance d along the body portion 12c. This distance serves to minimize or maximize moment couples or rotation generated either by the hand of the user U and/or simultaneously by the shifting weight or load of the transported game G. This is particularly noticeable when pulling deer from ditches and/or onto the bed of a pick-up truck. For minimum leverage the distance d between channels 12a, 12b is decreased to provide a concentrated pulling effect with minimized rotation. For maximum leverage the distance d between channels 12a, 12b is increased. The increase in the distance between the respective channels 12a, 12b adds to the comfort or maneuverability of the deer pull device, especially when transporting relatively large game.

Figure 3:
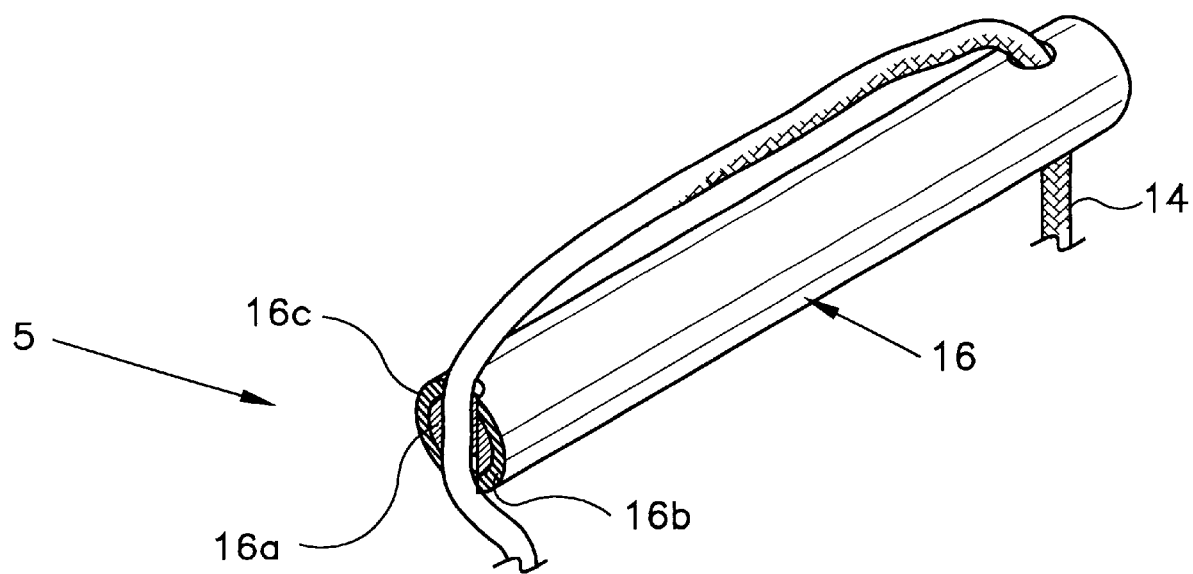
FIG. 3 is a sectional view of the deer handle according to a second embodiment.

As shown according to a second embodiment, FIG. 3 illustrates the deer pull 5, wherein the handle 16 comprises a core material 16a and a gripping material layer 16b surrounding the core material or element 16a. An adhesive layer 16c can also be used having thermal properties which do not degrade therebetween from constant use or weather related moisture over time. Thus, the handle 16 W made of a composite material comprising a core or metal material 16a such as stainless-steel, aluminum, or an alloy of metal. The gripping layer 16b being comprised of a rubber or composite rubber material. Similar advantages apply with this embodiment as it relate to minimizing and maximizing the distance d greater or lesser hand-leverage or hand-manipulation of the device.

In operation, the deer handle is draped over the killed game or deer and attached to the antlers to form a two-point contact therewith. This particular method of attachment keeps the device off the cape and provides for elevating the head of the deer as a sure fire grip for pulling as opposed to the conventional removal by hand gripping the slippery antlers alone to produce the same. A loop is formed with respect to the antlers such that the antlers are secured at two points for subsequent dragging via a one-hand grip and drag or a dual-hand-grip and drag.

The dual-hand-grip and drag is advantageous particularly when pulling game over ditches or onto the truck-bed of a pick-up truck. When lifting deer over the bed of the truck the following procedure is performed. First, a user U lowers the rear truck-bed door.

Second, the user U places the handle 12 of the deer pull 4 in a resting position with game G attached, on a corner portion of the lowered truck-bed door. The user U then releases the handle 12 of the deer pull 4, and mounts the truck bed. In a bent position with the back of the user U substantially straight the user U grips the handle 12 via a dual-hand-grip, with arms substantially locked in an extended position and close to his/her body, lifts the game G in a vertical direction using most of his/her leg power, thereby lifting and subsequently placing the game G clear into the bed of the truck.

Other features of the embodiment shown in FIGS. 1 and 2 may include a composite rubber material disposed on the handle body portion 12c to reduce or absorb moisture or the like from the hands of a user U. For aesthetic appeal rubber or plastic end caps can be attached to respective ends 12d and 12e so that channels 12a and 12b are not exposed. Other features may include either a channel for the rope 14 which extends along the handle a distance d beneath the moisture absorbing gripping layer or be disposed at the respective channels 12a, 12b as separate and discontinuous rope ends.

Figure 4:
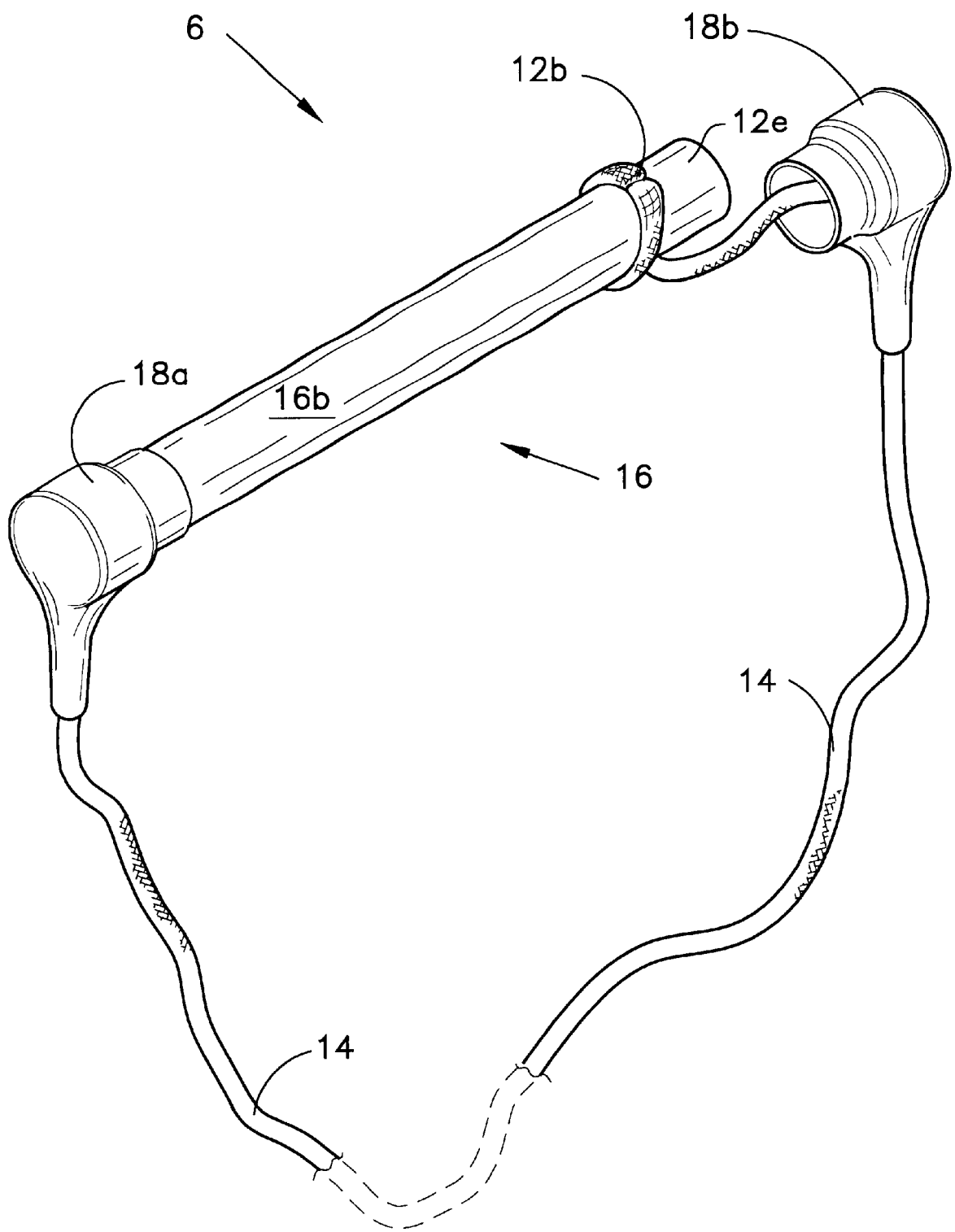
FIG. 4 is a perspective view of the deer handle according to a third embodiment.

As diagrammatically illustrated in FIG. 4 according to a third embodiment 6, the rope 14 attachments at the channels 12a, 12b are shown such that the channels are hidden by the aesthetic use of first and second rubber or plastic end caps 18a and 18b, respectively. The end caps 18a and 18b cover respective ends 12d and 12e and a portion of the rope 14 at both ends. The rope 14, gripping layer 16b and aesthetic use of end caps 18a, 18b can be color coordinated according to personal preference. The end caps primarily serve to cover any exposed knots or the like that are used to secure the ends of the rope 14 about and within channels 12a, 12b, and particularly the ends 12d and 12e of the device 4. Accordingly, the deer handle 6 as shown in FIG. 4, includes a continuous rope element 14 with no discontinuities or knots in the exposed portions of the rope 14.

It is to be understood that the present invention is not limited to the embodiments described above, but encompasses any and all embodiments within the scope of the following claims.

I claim:

1. A game pull device comprising:

a solid cylindrical handle having a first end and an opposite second end, said handle further including a first channel proximate the first end and a second channel proximate the second end, said second channel being parallel to said first channel;

a rope having opposite ends, each of the ends respectively extending through said first channel and said channel to form continuous closed loop;

means for securely attaching the ends of said rope respectively about said first channel and said second channel; and a pair of end caps attached respectively to the first end and the second end of said handle, whereby said attaching means and said first and second channels are covered by said end caps.

2. The game pull device according to claim 1, further including a layer of gripping material surrounding said cylindrical handle.

3. The game pull device according to claim 2, wherein said layer of gripping material is made of rubber.

4. The game pull device according to claim 2, wherein said layer of gripping material is adhesively attached to said cylindrical handle.

5. The game pull device according to claim 1, wherein said rope is made of a nylon material.

6. The game pull device according to claim 1, wherein said end caps are made of a plastic material.

* * * * *